(12) United States Patent
Jang et al.

(10) Patent No.: US 9,286,164 B2
(45) Date of Patent: Mar. 15, 2016

(54) ELECTRONIC DEVICE TO RESTORE MBR, METHOD THEREOF, AND COMPUTER-READABLE MEDIUM

(71) Applicant: Samsung Electronics Co., Ltd., Suwon-si, Gyeonggi-do (KR)

(72) Inventors: Min Jang, Suwon-si (KR); Jae-hwan Kim, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 202 days.

(21) Appl. No.: 13/710,650

(22) Filed: Dec. 11, 2012

(65) Prior Publication Data
US 2013/0232325 A1    Sep. 5, 2013

(30) Foreign Application Priority Data

Mar. 4, 2012  (KR) .................... 10-2012-0022089

(51) Int. Cl.
*G06F 11/00* (2006.01)
*G06F 11/14* (2006.01)

(52) U.S. Cl.
CPC .................. *G06F 11/1417* (2013.01)

(58) Field of Classification Search
CPC .................................... G06F 11/1417
USPC ........................ 713/1, 2; 714/2, 36
See application file for complete search history.

(56) References Cited

U.S. PATENT DOCUMENTS

| | | | | |
|---|---|---|---|---|
| 5,418,918 | A * | 5/1995 | Vander Kamp et al. | 713/2 |
| 5,421,006 | A * | 5/1995 | Jablon et al. | 714/36 |
| 6,792,556 | B1 * | 9/2004 | Dennis | 714/6.11 |
| 6,862,681 | B2 * | 3/2005 | Cheston et al. | 713/2 |
| 6,931,522 | B1 | 8/2005 | Raghavan et al. | |
| 6,996,706 | B1 * | 2/2006 | Madden et al. | 713/2 |
| 2002/0059498 | A1 | 5/2002 | Ng et al. | |
| 2004/0088367 | A1 * | 5/2004 | Reinke | 709/215 |
| 2004/0153840 | A1 * | 8/2004 | Buchanan et al. | 714/42 |
| 2006/0236399 | A1 | 10/2006 | Han | |
| 2007/0157013 | A1 | 7/2007 | Park | |
| 2008/0046781 | A1 | 2/2008 | Childs et al. | |
| 2008/0098381 | A1 * | 4/2008 | Lin | 717/168 |
| 2008/0184022 | A1 | 7/2008 | Peacock | |
| 2008/0301424 | A1 | 12/2008 | Barajas et al. | |
| 2009/0013167 | A1 * | 1/2009 | Wang | 713/2 |
| 2011/0202794 | A1 * | 8/2011 | Kim | 714/15 |
| 2014/0089615 | A1 * | 3/2014 | Watanabe | 711/162 |

FOREIGN PATENT DOCUMENTS

EP       1770513       4/2007

OTHER PUBLICATIONS

International Search Report dated May 16, 2013 issued in International Application No. PCT/KR2013/000414.
International Written Opinion dated May 16, 2013 issued in International Application No. PCT/KR2013/000414.
Extended European Search Report dated Jan. 2, 2014 issued in EP Application No. 13151740.1.

* cited by examiner

*Primary Examiner* — Joshua P Lottich
(74) *Attorney, Agent, or Firm* — Staas & Halsey LLP

(57) ABSTRACT

An electronic device includes a storage unit to store a master boot record (MBR) and an operating system, a control unit to boot the electronic device using the stored MBR and operating system, to generate and store backup data of the MBR in the storage unit when the electronic device is booted, a validity determination unit to determine validity of the MBR when a predetermined event has occurred, and a restoration unit to restore the MBR using the backup data stored in the storage unit if the MBR is not valid.

19 Claims, 8 Drawing Sheets

*ELECTRONIC DEVICE TO RESTORE MBR, METHOD THEREOF, AND COMPUTER-READABLE MEDIUM*

CROSS-REFERENCE TO RELATED APPLICATIONS

This application claims priority under 35 U.S.C. §119(a) from Korean Patent Application No. 10-2012-0022089, filed on Mar. 4, 2012, in the Korean Intellectual Property Office, the disclosure of which is incorporated herein by reference.

BACKGROUND OF THE INVENTION

1. Field of the Invention

The present disclosure relates to an electronic device to restore an MBR, a method thereof, and a computer-readable medium, and more particularly, to an electronic device to restore an MBR, a method thereof, and a computer-readable medium, which can restore the MBR that is damaged.

2. Description of the Related Art

In a general computer system, a series of booting operations is performed as follows when the system is turned on. First, in order for the computer system to operate normally, a master boot record (hereinafter referred to as an "MBR") that is stored in the first sector of a storage medium is read, and based on this, a boot sector record of a partition, in which an operating system is stored, is read to perform the system booting operation.

However, if the contents of the MBR are damaged due to problems, such as user mistakes, viruses, or system errors, the computer system becomes unable to boot. In this case, a user is unable to use the system, and it is required to reinstall an operating system to cause inconvenience to the user.

Accordingly, in order to cope with the damage of the contents of the MBR, a method for easily restoring the MBR has been requested.

SUMMARY OF THE INVENTION

The present general inventive concept provides an electronic device to restore an MBR, a method of restoring an MBR, and a computer-readable medium, which can restore the MBR that is damaged due to user mistakes, viruses, system errors, etc.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an electronic device including a storage unit to store a master boot record (MBR) and an operating system, a control unit to boot the electronic device using the MBR and the operating system stored, to generate and store backup data of the MBR in the storage unit if the electronic device is booted, a validity determination unit determine validity of the MBR if a predetermined event has occurred, and a restoration unit to restore the MBR using the backup data stored in the storage unit if the MBR is not valid.

The validity determination unit may determine the validity of the MBR through comparison of a boot code of the MBR with a boot code of the backup data.

The restoration unit may replace the boot code of the MBR by the boot code of the backup data if the MBR is not valid.

The validity determination unit may determine the validity of the MBR depending on whether information that indicates a booting partition is included in a partition table entry of the MBR.

The information that indicates the booting partition may be a boot flag.

The validity determination unit may determine the validity of the MBR depending on whether information which is related to the operating system is recorded in a storage region of the storage unit that corresponds to address information recorded in a partition table entry of the MBR.

The validity determination unit may determine the validity of the MBR depending on whether an address based on a BCD (Boot Configuration Data) of the operating system coincides with address information recorded in a partition table entry of the MBR.

The validity determination unit may determine the validity of the backup data if the MBR is not valid, and the restoration unit may restore the MBR using the backup data stored in the storage unit if the backup data is valid.

The control unit may store the backup data of the MBR in the storage unit in the form of a file.

The predetermined event may be at least one of an end of the operating system, a restart of the operating system, a user's logoff, and a switchover to a power saving mode.

The foregoing and/or other features and utilities of the present general inventive concept may also be achieved by providing a method of restoring a master boot record (MBR) of an electronic device, the method including booting the electronic device using the MBR and an operating system pre-stored, generating and storing backup data of the MBR if the electronic device is booted, determining validity of the MBR if a predetermined event has occurred, and restoring the MBR using the stored backup data if the MBR is not valid.

The validity determining operation may determine the validity of the MBR through comparison of a boot code of the MBR with a boot code of the backup data.

The restoring operation may replace the boot code of the MBR by the boot code of the backup data if the MBR is not valid.

The validity determining operation may determine the validity of the MBR depending on whether information that indicates a booting partition is included in a partition table entry of the MBR.

The information that indicates the booting partition may be a boot flag.

The validity determining operation may determine the validity of the MBR depending on whether information which is related to the operating system is recorded in a storage region of a storage unit that corresponds to address information recorded in a partition table entry of the MBR.

The validity determining operation may determine the validity of the MBR depending on whether an address based on a boot configuration data (BCD) of the operating system coincides with address information recorded in a partition table entry of the MBR.

The validity determining operation may determine the validity of the backup data if the MBR is not valid, and the restoring operation may restore the MBR using the backup data stored in a storage unit if the backup data is valid.

The storing operation may store the backup data of the MBR in the form of a file.

The foregoing and/or other features and utilities of the present general inventive concept may also be achieved by providing a computer-readable medium recorded with a program to execute a method of restoring a master boot record (MBR). The method of restoring the MBR may include booting an electronic device using the MBR and an operating system pre-stored, generating and storing backup data of the MBR if the electronic device is booted, determining validity of the MBR if a predetermined event has occurred, and restoring the MBR using the stored backup data if the MBR is not valid.

In the electronic device, the control unit may perform an operation corresponding to the event after the restoration unit restores the MBR using the backup data.

In the electronic device, the event may include a corruption of the MBR.

In the electronic device, the storage unit may include a first storage unit to store the MBR and a second storage unit to store the backup data of the MBR.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF EMBODIMENTS

Figure 1:
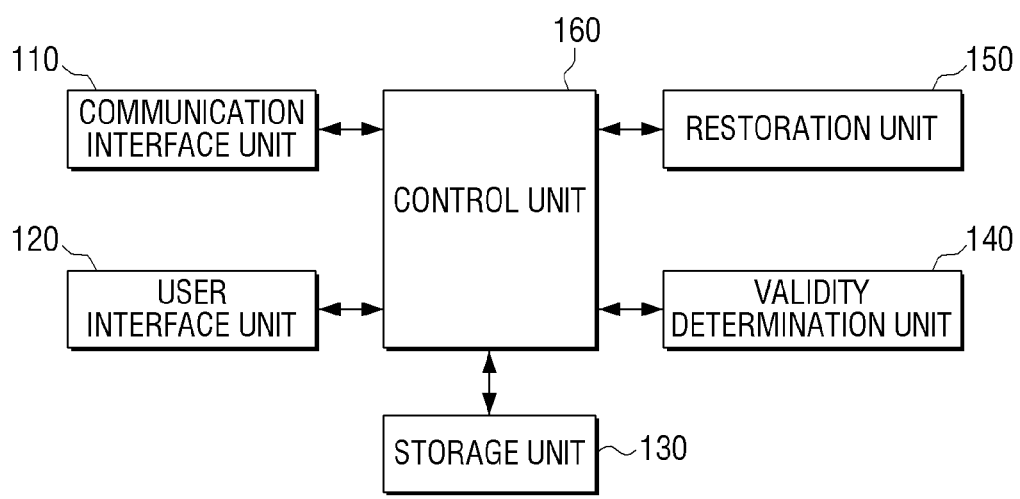
FIG. 1 is a diagram illustrating an electronic device according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a diagram illustrating an electronic device 100 according to an embodiment of the present general inventive concept.

Referring to FIG. 1, the electronic device 100 may include a communication interface unit 110, a user interface unit 120, a storage unit 130, a validity determination unit 140, a restoration unit 150, and a control unit 160. Here, the electronic device 100 may be a computer apparatus that performs booting using a master boot record (MBR), a notebook computer, a tablet, a portable media player (PMP), a mobile phone, or the like.

The communication interface unit 110 is formed to connect the electronic device 100 to an external device (not illustrated). The communication interface unit 110 may be connected to the external device through a wired or wireless communication method, for example, a local area network (LAN), Internet, global system for mobile communications (GSM), universal mobile telecommunications system (UMTS), long term evolution (LTE), wireless Broadband (WiBRO), and the like.

The user interface unit 120 is provided with a number of function keys through which a user can set or select various kinds of functions of the electronic device 100, and displays various kinds of information provided by the electronic device 100. The user interface unit 120 may be implemented by a device that simultaneously performs an input function and an output function, such as a touchpad, or a device that provides combined functions of a mouse and a monitor.

The storage unit 130 may have one or more non-volatile memory devices and may store one or more programs therein to drive the electronic device 100. The storage unit 130 may store a program that is a set of various kinds of commands required to drive the electronic device 100. Here, the program includes a master boot record (MBR) and an operating system. The operating system is an operating program to drive the electronic device 100, and the MBR is information to identify where and how the operating system is located in a booting process of the electronic device 100 and to load the operating system in a main storage device of the electronic device 100, and is positioned in the first sector of a storage medium, for example, the storage unit 130. The detailed configuration of the MBR will be described later with reference to FIGS. 2 and 3.

The validity determination unit 140 determines the validity of the MBR if a predetermined event has occurred. The validity determination unit 140 can determine whether a boot code entry of the MBR and a partition table entry are valid if an event, such as an end of the operating system, a restart of the operating system, a user's logoff, and a switchover to a power saving mode, has occurred.

The validity determination unit 140 may determine the validity of the MBR through comparison of a boot code of the MBR with a boot code of backup data. Here, the boot code is an entry storing various kinds of commands that can read a boot sector record of a partition, in which the operating system to be loaded in a memory device is stored.

The backup data is data in which the MBR is backed up when the electronic device 100 is normally booted. The backup data may be stored in a memory device, for example, a non-volatile memory device of the storage unit 130. Accordingly, the boot code of the MBR when the booting is normally performed is valid, and thus the boot code of the corresponding backup data is also valid. Thus, the validity of the boot code of the MBR can be determined through simple comparison of the boot code of the backup data with the boot code of the current MBR. At this time, if the boot code of the current MBR is different from the boot code of the backup data, the validity determination unit 140 may determine that the boot code of the MBR is not valid.

The MBR may include four partition table entries that contain information on partitions, and one of the partition table entries includes information indicating that the corresponding partition is a booting partition. However, the information indicating that the corresponding partition is a booting partition is not included in all the four partition table entries, the booting is unable to be performed. Accordingly, the validity determination unit 140 may determine the validity of the MBR depending on whether the information that indicates the booting partition is included in the partition table entry of the MBR.

The validity determination unit 140 confirms whether at least one of boot flags (or boot indicators), which are the $0^{th}$ bytes of the four partition table entries of the MBR, includes the information that indicates the booting partition. When at least one partition table entry includes the information that indicates the booting partition, that is, if 0x80h is set in at least one partition table entry, the validity determination unit 140 determines that the MBR is a valid MBR. When 0x80h is not set in any partition table, it determines that the MBR is an invalid MBR.

The partition table entry may include information indicating whether the corresponding partition is the booting partition, and address information of the corresponding partition (that is, positions of a header and a cylinder of a start sector, positions of a header and a cylinder of an end sector of the corresponding partition, and the whole number of sectors of the corresponding partition). Accordingly, in the booting process, the booting is performed using the operating system recorded in the partition which corresponds to the address information of the partition table entry (that is, booting partition) that includes the information indicating the booting partition as described above.

However, when the partition table entry that does not actually store the operating system includes the information indicating the booting partition or when the address information in the corresponding partition table entry becomes corrupt due to user mistakes, viruses, or system errors, the booting is unable to be performed. Accordingly, the validity determination unit 140 may determine the validity of the MBR depending on whether information which is related to the operating system is recorded in a storage region of the storage unit 130 that corresponds to the address information recorded in the partition table entry of the MBR. This operation will be described later with reference to FIG. 9.

The validity determination unit 140 may determine the validity of the MBR depending on whether an address based on a boot configuration data (BCD) of the operating system coincides with the address information recorded in the partition table entry of the MBR. Such a validity determination operation will be described later with reference to FIG. 10.

When the MBR is not valid, the validity determination unit 140 determines the validity of the backup data. When it is determined that the MBR is not valid, the validity determination unit 140 may perform the above-described validity determination operation with respect to the backup data. It is possible that the validity determination of a boot code of the backup data may not be performed.

When the MBR is not valid, the restoration unit 150 restores the MBR using the backup data stored in the storage unit 130. When it is determined that the MBR is not valid and the backup data is valid, the restoration unit 150 may restore the MBR using the backup data stored in the storage unit 130. When it is determined that the boot code of the MBR is not valid, the restoration unit 150 may restore only the boot code of the MBR using the boot code of the backup data. Although the validity determination unit 140 and the restoration unit 150 are illustrated and described as separate configurations, the present general inventive concept is not limited thereto. The functions of the validity determination unit 140 and the restoration unit 150 can be implemented by one configuration or can be formed as a single unit.

The control unit 160 controls the respective configurations in the electronic device 100. When the system is turned on, the control unit 160 may perform the booting based on the MBR and the operating system stored in the storage unit 130. When the electronic device 100 is booted, the control unit 160 may generate the backup data of the MBR and store the generated backup data in the storage unit 130. At this time, the backup data may be in the form of a file. Although this embodiment illustrates that the control unit 160 generates and stores the backup data, the present general inventive concept is not limited thereto. The generation and storage of the backup data may be performed by the above-described validity determination unit 140 or restoration unit 150. Although it is described that the generated backup data is stored in the storage unit 130, the backup data may also be stored in the basic input output system (BIOS) of the electronic device 100.

If an event, such as an end of the operating system, a restart of the operating system, a user's logoff, and a switchover to a power saving mode, has occurred, the control unit 160 may control the validity determination unit 140 to determine the validity of the current MBR. When it is determined that the MBR is valid, the control unit 160 may perform the operation that corresponds to the event occurred.

When it is determined that the MBR is not valid, the control unit 160 may control the validity determination unit 140 to determine the validity of the backup data of the MBR. When it is determined that the MBR is valid, the control unit 160 may control the restoration unit 150 to restore the MBR using the backup data, and perform the operation that corresponds to the event occurred after the restoration.

As described above, the electronic device 100 according to an embodiment of the present general inventive concept performs backup of the MBR at a time when the electronic device 100 is booted normally, determines the validity of the MBR at an end time, and performs restoration using the backup data that has been backed up when the MBR becomes invalid. Further, the electronic device 100 according to an embodiment of the present general inventive concept checks the validity based on actual data (current data) of the MBR, restores the MBR if necessary, and then performs an operation corresponding to the event according to the restored MBR, and thus a stable environment can be provided to the user.

When a storage area of the storage unit 130 is corrupted or damaged due to various kinds of events affecting the MBR and the MBR stored in storage area is not able to be restored, the control unit 160 may store a location of the backup data in the storage unit 130, and the location of the backup data can be used to read the backup data as the MBR when an operation corresponding to the event is performed.

Figure 2:
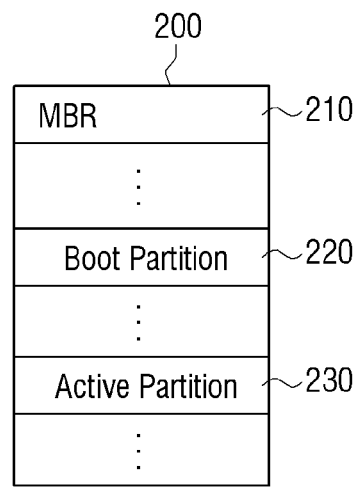
FIG. 2 is a diagram illustrating a storage structure of a storage unit according to an embodiment of the present general inventive concept.

FIG. 2 is a diagram illustrating a storage structure of a storage unit according to an embodiment of the present general inventive concept.

The storage unit 130 may include a memory device to store an MBR 210, a boot partition 220, and an active partition 230.

The MBR 210 is information to identify where and how the operating system is located and to load the operating system in a main storage device of a computer apparatus, such as the electronic device 100. The MBR 210 may be located in a first sector of a storage medium (for example, a hard disk), for example, the storage unit 130 of FIG. 1.

The MBR is also referred to as a partition sector or a master partition table since the MBR has information on a form, a size, and a location of respective partition entries that are divided when the storage medium is formatted. The detailed structure of the MBR will be described later with reference to FIG. 3.

The boot partition (or the system partition) 220 is a partition which has a bootstrap file that can boot the operating system and proceeds to booting. In the illustrated example, the boot partition is arranged to be spaced apart from the active partition 230. However, the boot partition 220 may be arranged in the active partition 230.

The active partition 230 is a partition in which the operating system is stored.

On the other hand, although the boot partition 220 and the active partition 230 are separately illustrated and described in FIG. 2, the boot partition 220 and the active partition 230 may be in a non-separated form, that is, may form one partition depending on the structure of the electronic device 100 or the operating system.

Figure 3:
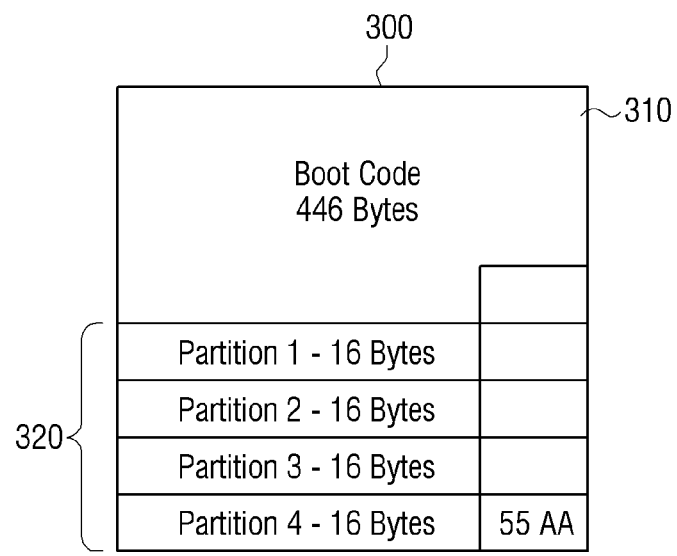
FIG. 3 is a diagram illustrating a structure of an MBR illustrated in FIG. 2.

FIG. 3 is a diagram illustrating an MBR 300 as an example of the MBR 210 of FIG. 2.

Referring to FIG. 3, the MBR 300 includes a boot code 310, a partition table entry 320, and a reservation entry 55AA. The MBR 300 is located in the first sector of the storage medium, is composed of one sector, and typically has a size of 512 bytes, for example.

The boot code 310 is an entry in which a series of commands that correspond to a preparation stage to read the operating system is recorded, and has a size of 446 bytes, for example.

The partition table entry 320 is a table that contains information on the partitions, and has a size of 64 bytes, for example. When 16 bytes are required to specify one partition, four main partitions may be designated in one storage medium.

In the table storing the information on the respective partitions, a boot flag indicating whether the corresponding partition is the booting partition, locations of a header and a cylinder of a start sector, locations of a header and a cylinder of an end sector of the corresponding partition, and the whole number of sectors of the corresponding partition.

In the booting process, a preparation operation is performed using the boot code of the MBR, the partition in which the boot flag is set to active (0x80h) becomes the booting partition, and the system is booted based on the operating system recorded in the corresponding partition.

In the preparation operation of the booting process, the booting is unable to be performed ① in a case where a wrong (incorrect) command is recorded in the boot code, ② in a case where the booting partition information is not included in all the partition table entries, and ③ in a case where the operating system is not stored in the actual partition entry that corresponds to the booting partition entry (including a case where address information of the booting partition is different from the address of the partition in which the operating system is recorded).

Accordingly, the validity determination unit 140 according to this embodiment may perform a series of processes to confirm the above-described cases ① to ③.

The reservation entry 55AA is the entry in which a reservation value to confirm whether the MBR is correct, and has a size of 2 bytes.

Figure 4:
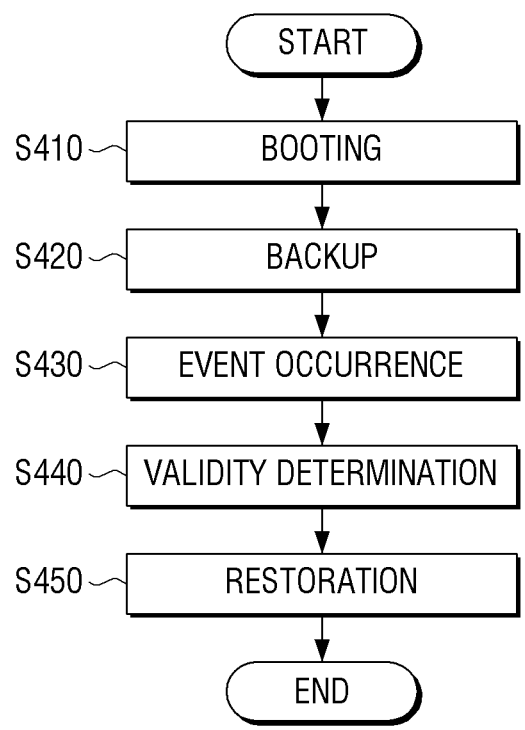
FIG. 4 is a flowchart illustrating a method of restoring an MBR according to an embodiment of the present general inventive concept.

FIG. 4 is a flowchart illustrating a method of restoring an MBR in an electronic device according to an embodiment of the present general inventive concept.

First, the electronic device is booted using a pre-stored master boot record (MBR) and operating system at operation S410. The booting operation may be performed through reading of the MBR stored in the first sector of the storage medium and reading of the boot sector record of the partition (active partition) in which the operating system is stored based on the read MBR.

When the electronic device is booted, the backup data of the MBR is generated and stored at operation S420. When the electronic device 100 is normally booted, the backup data of the MBR at the booting time is generated and stored. That is, the MBR is valid when the booting is normally performed, and thus the MBR at the booting time can be stored as the backup data.

When a predetermined event has occurred at operation S430, the validity of the MBR is determined at operation S440. When an event, such as an end of the operating system, a restart of the operating system, a user's logoff, and a switchover to a power saving mode, has occurred, it can be determined whether the boot code entry of the MBR and the partition table entry are valid. At this time, when it is determined that the MBR is not valid, the validity of the backup data is unable to be determined.

If the MBR is not valid, the MBR is restored using the stored backup data at operation S440. When it is determined that the MBR is not valid and the backup data is valid, the MBR can be restored using the backup data generated at the booting time. When it is determined that the boot code of the MBR is not valid, only the boot code of the MBR can be restored using the boot code of the backup data.

Accordingly, the method of restoring the MBR according to this embodiment performs backup of the MBR at a time when the booting is normally performed, determines the validity of the MBR at an end time, and performs the restoration using the data that has been backed up when the MBR is not valid. Further, the method of restoring the MBR according to this embodiment may include checking the validity based on the actual data of the MBR, and thus a stable environment can be provided to the user. The method of restoring the MBR as illustrated in FIG. 4 can be executed through the electronic device having the configuration of FIG. 1 or an electronic device having other configurations.

Further, the method of restoring the MBR as described above may be implemented by at least one execution program to execute the above-described method of restoring the MBR, and such an execution program may be stored in a computer-readable medium.

Accordingly, respective blocks (operations) according to an embodiment of the present general inventive concept may be executed as computer-recordable codes contained in the computer-readable medium. The computer-readable medium may be a device which can store data that can be read by a computer system.

Figure 5:
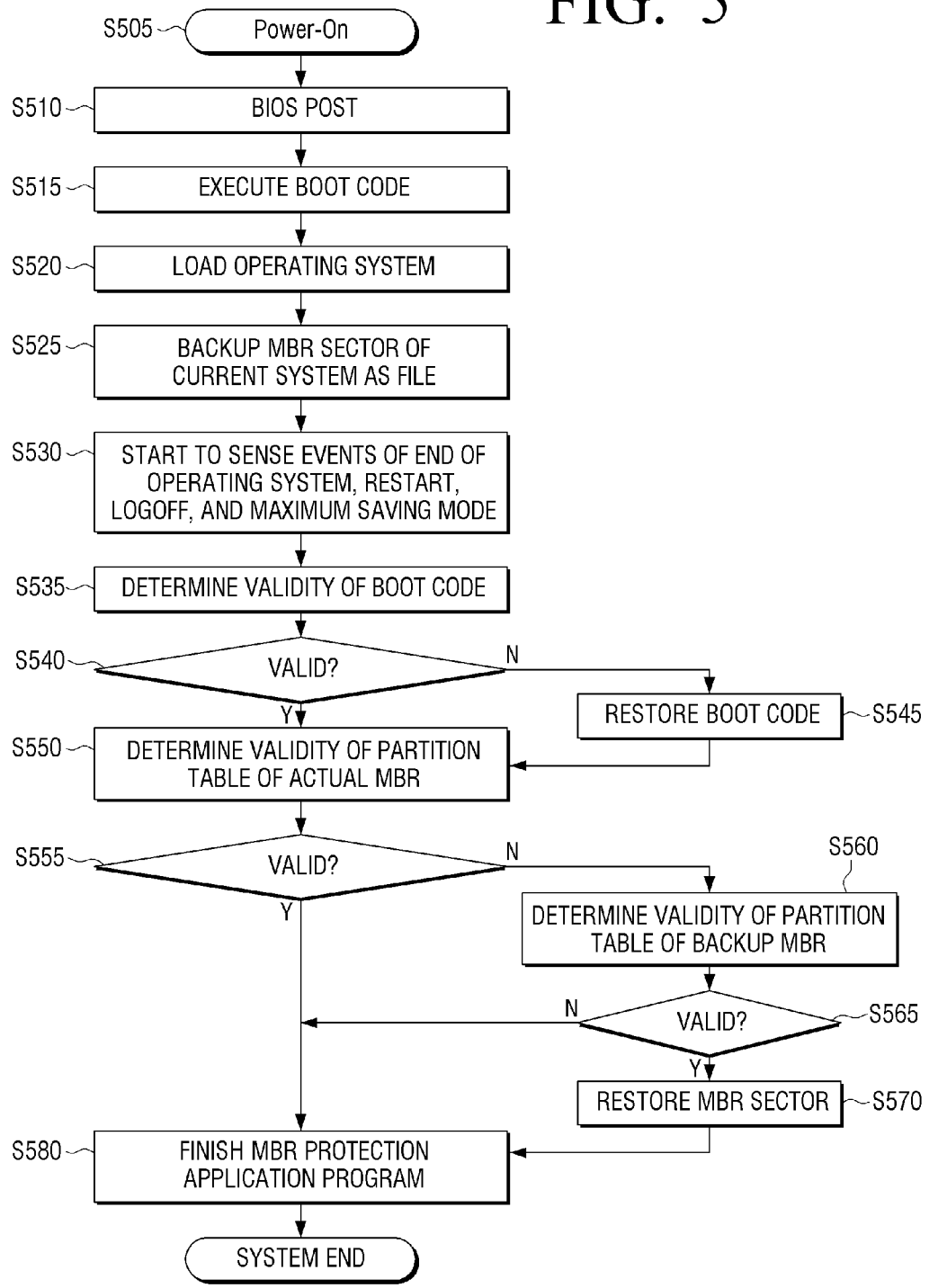
FIG. 5 is a flowchart illustrating the method of FIG. 4.

FIG. 5 is a flowchart illustrating a method of restoring an MBR in an electronic device according to an embodiment of the present general inventive concept. The method of FIG. 5 may correspond to the method of FIG. 4 and may be performed in the electronic device 100 of FIG. 1

Referring to FIG. 5, when a power is supplied to the electronic device 100 at operation S505, the BIOS performs a start-up routine. Here, the start-up routine is a series of processes which are automatically executed when the electronic device is turned on to check the state of the electronic device (POST), initialize the system, and confirm which peripheral device is connected during the initialization process.

According to the start-up routine of the BIOS, the boot code of the MBR that is stored in the first sector of the storage medium is executed at operation S515, and the operating system recorded in the booting partition that is recorded in the partition table entry of the MBR is read to perform the booting at operation S520.

When the booting is performed, the backup data of the MBR is generated and stored at operation S525. An application program to manage the MBR is executed after the operating system is loaded, and 512 bytes of the MBR entry normally booted can be backed up as a file through the executed application program. Although it is described that the MBR entry is backed up in the storage medium as a file, the present general inventive concept is not limited thereto. The MBR may be backed up in the BIOS.

Thereafter, it is sensed whether the predetermined event has occurred at operation S530. The MBR restoration operation according to this embodiment is to seek stability of a next booting, and is performed at a time when the operating system is ended (for example, the end of the operating system, restart, user's logoff, and switchover to the power saving mode). Accordingly, an application program can sense whether the event has occurred.

If the predetermined event has occurred, the validity of the MBR is determined. First, the validity of the boot code of the MBR is determined at operation S535. This will be described later with reference to FIG. 6.

If the boot code of the MBR is not valid as the result of the determination at operation S540-N, the boot code of the MBR can be restored using the boot code of the backup data at operation S545. Specifically, the boot code of the MBR can be restored through overwrite of the boot code of the backup data into the boot code entries 0 to 445 of the MBR.

Then, if the boot code of the MBR is valid as the result of the determination at operation S540-Y or the boot code of the MBR is restored, the validity of the partition table of the MBR is determined at operation S550. This will be described later with reference to FIGS. 7 to 10.

If the partition table of the MBR is not valid as the result of the determination at operation S555-N, the validity of the partition table of the backup data is determined at operation S560. The detailed validity determination operation of the backup data may be the same as the validity determination operation of the partition table of the MBR. Accordingly, descriptions thereof will not be repeated.

When the partition table of the backup data is valid as the result of the determination at operation S565-Y, the partition table of the MBR can be restored using the partition table of the backup data at operation S570.

However, when the partition table of the backup data is not valid at operation S565-N, a separate restoration operation is not performed.

Thereafter, the performed application program is ended at operation S580, and an operation that corresponds to the event occurred is performed.

The method of restoring the MBR as illustrated in FIG. 5 can be executed through the electronic device having the configuration of FIG. 1 or an electronic device having other configurations. Further, the operations S525 to S580 of the method of restoring the MBR as described above may be implemented by an application program, and such an application program may be stored in a computer-readable medium. Although it is described that the above-described operation is performed through the application program, the operating system may perform the operation during the implementation.

Figure 6:
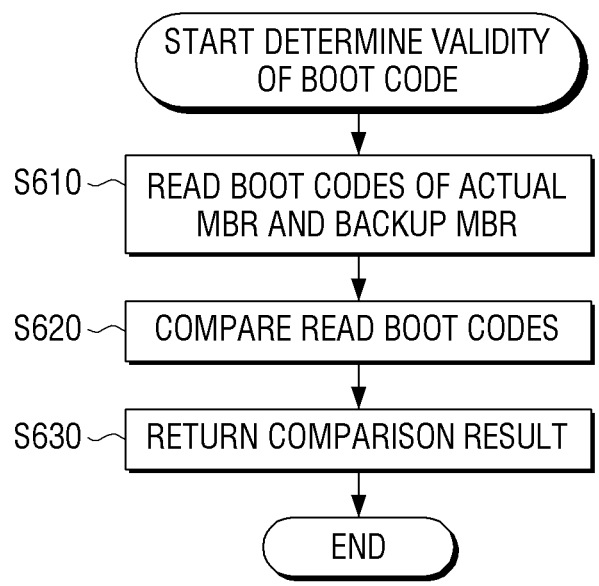
FIG. 6 is a flowchart illustrating an operation of determining the validity of a boot code of an MBR illustrated in FIG. 5.

FIG. 6 is a flowchart illustrating an operation of determining the validity of the boot code of the MBR illustrated in FIG. 5.

Referring to FIG. 6, the boot code (446 bytes) of the MBR and the boot code (466 bytes) of the backup data are read at operation S610.

Then, it is determined whether the read boot code of the MBR is the same as the boot code of the backup data through simple comparison of the boot code of the MBR with the boot code of the backup data at operation S620.

Then, the result of the determination is returned at operation S630. When the read boot code of the MBR is the same as the boot code of the backup data, it is determined that the boot code of the MBR is valid, and the determined value can be returned. By contrast, if the read boot code of the MBR is different from the boot code of the backup data, it is determined that the boot code of the MBR is not valid, and the determined value can be returned.

Figure 7:
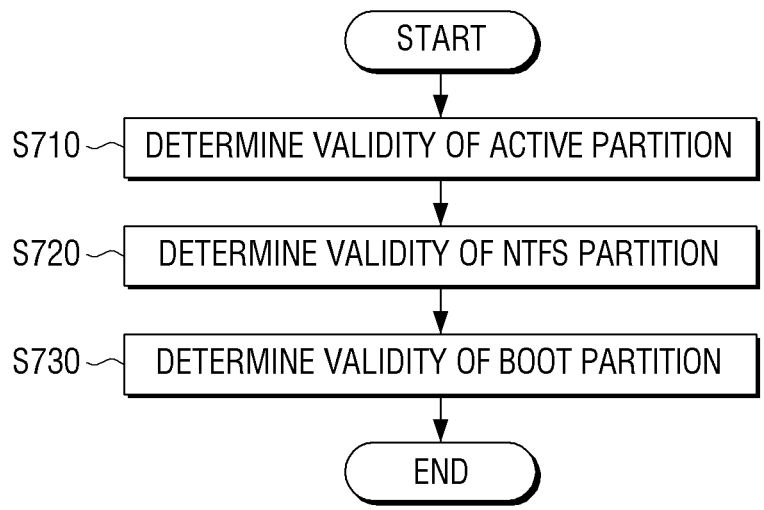
FIG. 7 is a flowchart illustrating an operation of determining the validity of a partition table of an MBR illustrated in FIG. 5.

FIG. 7 is a flowchart illustrating an operation of determining the validity of the partition table of the MBR illustrated in FIG. 5.

Referring to FIG. 7, the validity of the active partition is first determined at operation S710. The details of the validity determination of the active partition will be described later with reference to FIG. 8.

Then, the validity of a new technology file system (NTFS) partition is determined at operation S720. The details of the validity determination of the NTFS partition will be described later with reference to FIG. 9.

Then, the validity of the boot partition is determined at operation S730. The details of the validity determination of the boot partition will be described later with reference to FIG. 10.

Although it is illustrated and described that the validity of the boot partition is determined after determining the validity of the NTFS partition, the present general inventive concept is not limited thereto. The validity of the boot partition may be first determined and then the validity of the NTFS partition may be determined.

Further, if the validity is not recognized in any one of the above-described three determination operations, it may be determined that the partition table of the MBR is not valid without performing the next determination operation. That is, in a case where the validity is recognized in all the three operations, it may be determined that the partition table of the MBR is valid.

Although the embodiment describes that the validity of the partition table of the MBR is determined using all the three determination methods, the present general inventive concept is not limited thereto. It is possible that only one or two of the three determination methods may be used during the implementation.

Figure 8:
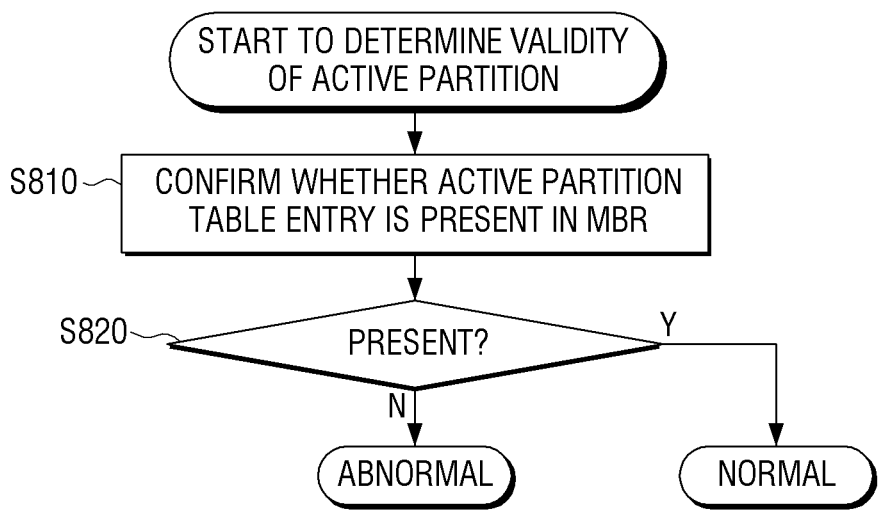
FIG. 8 is a flowchart illustrating an operation of determining the validity of an active partition illustrated in FIG. 7.

FIG. 8 is a flowchart illustrating an operation of determining the validity of the active partition illustrated in FIG. 7.

Referring to FIG. 8, it is first determined whether the partition table having the information (boot flag) indicating that the partition table itself is the booting partition is present in the partition table entry of the MBR at operation S810. When four partition tables are present in the MBR in total, it is searched whether the boot flag of $0^{th}$ byte of the partition table is set to 0x80. The boot flag is checked through four times repetition in total, and if at least one boot flag is present at operation S820-Y, it is determined that the active partition is valid.

When no boot flag is present at operation S820-N, it is determined that the active partition is not valid, and the validity determination operation for the partition table entry of the MBR can be finished.

Figure 9:
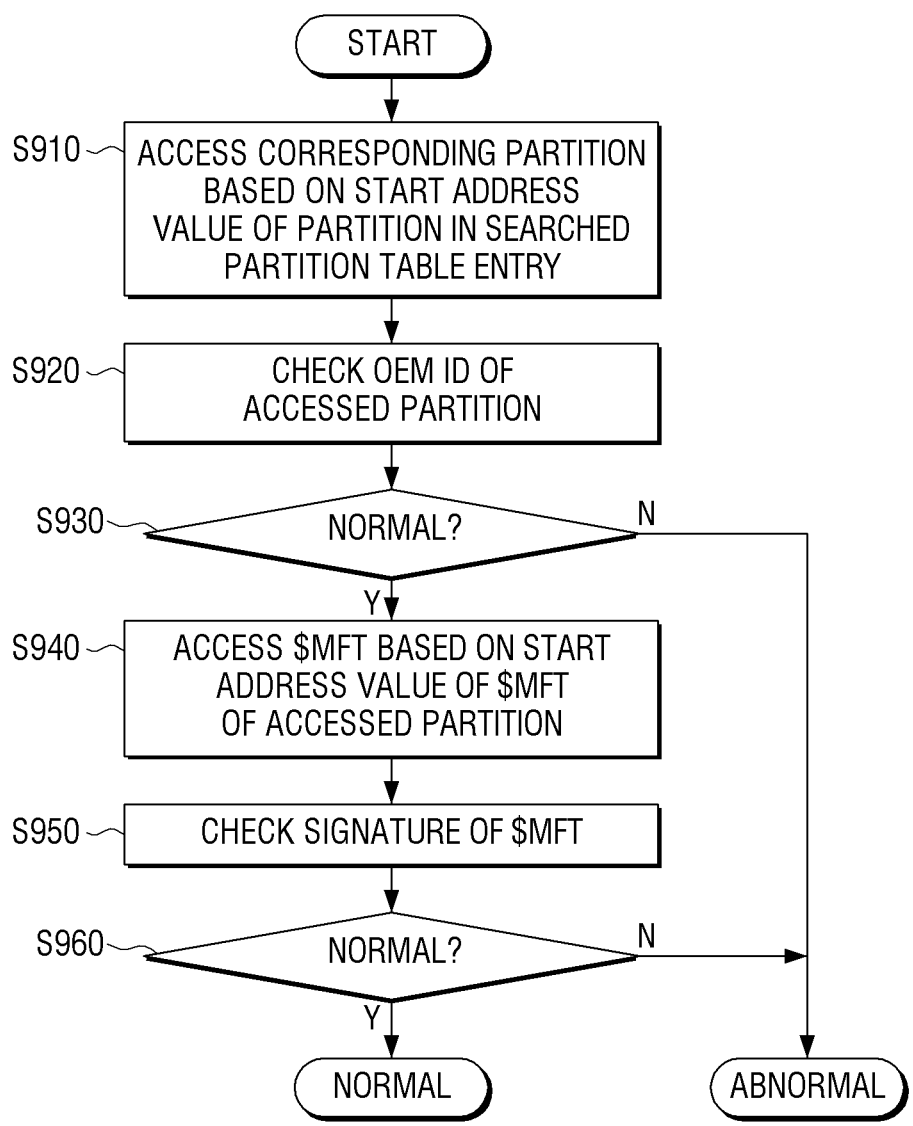
FIG. 9 is a flowchart illustrating an operation of determining the validity of an NTFS partition illustrated in FIG. 7.

FIG. 9 is a flowchart illustrating an operation of determining the validity of the new technology file system (NTFS) partition illustrated in FIG. 7.

Referring to FIG. 9, the corresponding booting partition is accessed based on the address information of the booting partition at operation S910. Through the operation of FIG. 8, the boot flag can access the corresponding partition (that is, booting partition) based on the address information (specifically, 4 byte values of 0x08h to 0x0bh) recorded in the partition table in which the boot flag is set to 0x80h.

Further, an OEM ID of the accessed partition is confirmed at operation S920. The validity of the NTFS partition may be determined based on the OEM ID (0x0003h to 0x000Ah) of the boot sector of the accessed partition. Generally, in the case of formatting the storage medium as NTFS, the OEM ID is filled with NTFS. Accordingly, it can be determined whether the NTFS partition is valid through confirming whether an OEM ID value is the NTFS. In this embodiment, only the NTFS format has been described. However, the present general inventive concept is not limited thereto. With respect to the storage medium that adopts another format type, a method that corresponds to the corresponding format type may be adopted.

When the OEM ID is abnormal as the result of the determination at operation S930-N, it is determined that the NTFS partition is not valid, and the validity determination operation for the partition table entry of the MBR may be finished.

When the OEM ID is normal at operation S930-Y, $MFT is accessed based on the $MFT start address value of the accessed partition at operation S940. Specifically, $MFT can be accessed using the start address values 0x0030h to 0x0037h of $MFT of the boot sector of the accessed partition.

Then, the signature of $MFT is confirmed at operation S950. A normal master file table (MFT) has "File" as a signature value. Accordingly, the validity of the NTFS partition can be determined depending on whether the signature value is "File".

When the signature value is "File" as the result of the determination at operation S960-Y, it may be determined that the NTFS partition is valid.

When the signature value is not "File" at operation S970-N, it is determined that the NTFS partition is not valid, and the validity determination operation for the partition table entry of the MBR can be finished.

Figure 10:
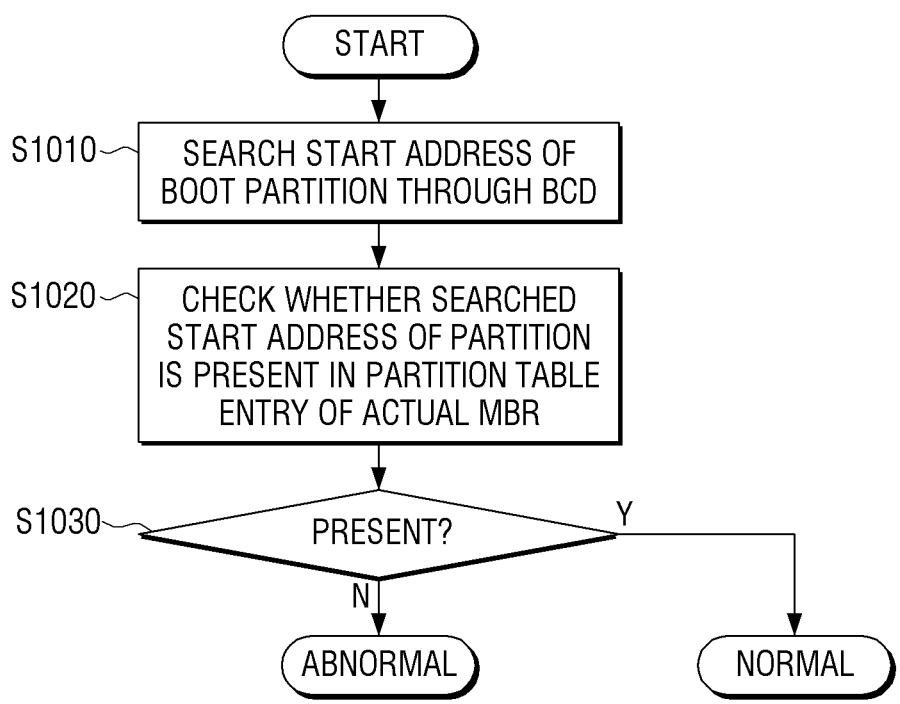
FIG. 10 is a flowchart illustrating an operation of determining the validity of a boot partition illustrated in FIG. 7.

FIG. 10 is a flowchart illustrating an operation of determining the validity of the boot partition illustrated in FIG. 7.

Referring to FIG. 10, the start address of the boot partition is first searched for through boot configuration data (BCD) at operation S1010. The start address of the boot partition can be obtained based on the contents of the BCD of the operating system. Here, the searched address has a value of "a value recorded in the partition table entry of the MBR*sector size" (512). On the other hand, during the implementation, the start address of the boot partition can be obtained based on the contents of the BCD recorded in a register of the operating system.

Further, it is determined whether the address information that is searched for in the previous process is present in the partition table area of the MBR at operation S1020. It is determined whether the address searched for in the previous process (that is, the start address of the boot partition) is the same as the start address recorded in the four partition table entries of the actual MBR.

If the same partition table entry is present as the result of the determination at operation S1030-Y, it may be determined that the boot partition is valid.

However, when the same partition table entry is not present at operation S1030-N, it is determined that the boot partition is not valid, and the validity determination operation for the partition table entry of the MBR can be finished.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An electronic device comprising:
a storage unit to store a master boot record (MBR) and an operating system;
a control unit to boot the electronic device using the MBR and the operating system stored, and to generate and store backup data of the MBR in the storage unit when the electronic device is booted;
a validity determination unit configured to determine validity of the MBR at an ending of the operating system, the ending of the operating system being at a time of a user's logoff or a switchover to a power saving mode of the electronic device; and
a restoration unit to restore the MBR using the backup data stored in the storage unit when the MBR is not valid.

2. The electronic device of claim 1, wherein the validity determination unit determines the validity of the MBR through comparison of a boot code of the MBR with a boot code of the backup data.

3. The electronic device of claim 2, wherein the restoration unit replaces the boot code of the MBR by the boot code of the backup data if the MBR is not valid.

4. The electronic device of claim 1, wherein the validity determination unit determines the validity of the MBR depending on whether information that indicates a booting partition is included in a partition table entry of the MBR.

5. The electronic device of claim 4, wherein the information that indicates the booting partition is a boot flag.

6. The electronic device of claim 1, wherein the validity determination unit determines the validity of the MBR depending on whether information which is related to the operating system is recorded in a storage region of the storage unit that corresponds to address information recorded in a partition table entry of the MBR.

7. An electronic device comprising:
a storage unit to store a master boot record (MBR) and an operating system;
a control unit to boot the electronic device using the MBR and the operating system stored, and to generate and store backup data of the MBR in the storage unit when the electronic device is booted;
a validity determination unit to determine validity of the MBR when a predetermined event has occurred, the predetermined event being at least one of an ending or starting of the operating system, a user's logoff, and a switchover to a power saving mode of the electronic device; and a restoration unit to restore the MBR using the backup data stored in the storage unit when the MBR is not valid, wherein the validity determination unit determines the validity of the MBR depending on whether an address based on a BCD (Boot Configuration Data) of the operating system coincides with address information recorded in a partition table entry of the MBR.

8. The electronic device of claim 1, wherein:
the validity determination unit determines the validity of the backup data if the MBR is not valid; and
the restoration unit restores the MBR using the backup data stored in the storage unit if the backup data is valid.

9. The electronic device of claim 1, wherein the control unit stores the backup data of the MBR in the storage unit in a form of a file.

10. A method of restoring a master boot record (MBR) of an electronic device, the method comprising:
booting the electronic device using a pre-stored MBR and operating system;
generating and storing backup data of the MBR if the electronic device is booted;
determining validity of the MBR at an ending of the operating system, the ending of the operating system being at a time of a user's logoff or a switchover to a power saving mode of the electronic device; and
restoring the MBR using the stored backup data if the MBR is not valid.

11. The method of claim 10, wherein the validity determining operation includes determining the validity of the MBR through comparison of a boot code of the MBR with a boot code of the backup data.

12. The method of claim 11, wherein the restoring operation includes replacing the boot code of the MBR by the boot code of the backup data when the MBR is not valid.

13. The method of claim 10, wherein the validity determining operation includes determining the validity of the MBR depending on whether information that indicates a booting partition is included in a partition table entry of the MBR.

14. The method of claim 13, wherein the information that indicates the booting partition is a boot flag.

15. The method of claim 10, wherein the validity determining operation includes determining the validity of the MBR depending on whether information which is related to the operating system is recorded in a storage region of a storage unit that corresponds to address information recorded in a partition table entry of the MBR.

16. The method of claim 10, wherein:
the validity determining operation includes determining the validity of the backup data if the MBR is not valid; and
the restoring operation include restoring the MBR using the backup data stored in a storage unit when the backup data is valid.

17. The method of claim 10, wherein the storing operation includes storing the backup data of the MBR in the form of a file.

18. A method of restoring a master boot record (MBR) of an electronic device, the method comprising:
booting the electronic device using a pre-stored MBR and operating system;
generating and storing backup data of the MBR if the electronic device is booted;
determining validity of the MBR if a predetermined event has occurred, the predetermined event being at least one of an ending or starting of the operating system, a user's logoff, and a switchover to a power saving mode of the electronic device; and
restoring the MBR using the stored backup data if the MBR is not valid,
wherein the validity determining operation includes determining the validity of the MBR depending on whether an address based on a boot configuration data (BCD) of the operating system coincides with address information recorded in a partition table entry of the MBR.

19. A non-transitory computer-readable medium to contain computer-readable codes as a program to execute a method of restoring a master boot record (MBR), the method comprising:
booting the electronic device using a pre-stored MBR and operating system;
generating and storing backup data of the MBR if an electronic device is booted;
determining validity of the MBR at an ending of the operating system, the ending of the operating system being at a time of a user's logoff or a switchover to a power saving mode of the electronic device; and
restoring the MBR using the stored backup data if the MBR is not valid.

* * * * *